US011321374B2

(12) United States Patent
Steiert et al.

(10) Patent No.: US 11,321,374 B2
(45) Date of Patent: May 3, 2022

(54) EXTERNAL STORAGE OF UNSTRUCTURED DATABASE OBJECTS

(71) Applicant: SAP SE, Walldorf (DE)

(72) Inventors: Martin Steiert, Heidelberg (DE); Horst Schaude, Kraichtal (DE); Regina Aboobacker, Bangalore (IN); Sreekanth K, Kottayam (IN); Pavan Kumar, Bangalore (IN)

(73) Assignee: SAP SE, Walldorf (DE)

( * ) Notice: Subject to any disclaimer, the term of this patent is extended or adjusted under 35 U.S.C. 154(b) by 29 days.

(21) Appl. No.: 16/898,899

(22) Filed: Jun. 11, 2020

(65) Prior Publication Data
US 2021/0342378 A1 Nov. 4, 2021

(30) Foreign Application Priority Data
Apr. 29, 2020 (IN) .............................. 202011018394

(51) Int. Cl.
*G06F 16/35* (2019.01)
*G06F 16/31* (2019.01)
(52) U.S. Cl.
CPC .............. *G06F 16/35* (2019.01); *G06F 16/31* (2019.01)

(58) Field of Classification Search
CPC ......... G06F 16/35; G06F 16/31; G06F 16/972
See application file for complete search history.

(56) References Cited

U.S. PATENT DOCUMENTS

| 10,594,792 | B1* | 3/2020 | Danilov | H04L 67/1097 |
| 10,650,032 | B1* | 5/2020 | Laurence | G06F 16/335 |
| 10,803,197 | B1* | 10/2020 | Liao | G06F 21/604 |
| 2009/0164790 | A1* | 6/2009 | Pogodin | G06F 21/64 |
| | | | | 713/176 |
| 2019/0362014 | A1* | 11/2019 | Ikhlaq | G06F 16/9024 |
| 2020/0356474 | A1* | 11/2020 | Doddameti | G06F 11/3079 |
| 2021/0109891 | A1* | 4/2021 | Vokaliga | G06F 16/125 |

* cited by examiner

Primary Examiner — Dangelino N Gortayo
(74) Attorney, Agent, or Firm — Buckley, Maschoff & Talwalkar LLC

(57) ABSTRACT

Systems and methods to migrate unstructured objects such as, but not limited to, attachments and platform change documents from a database to a cloud-provided external object storage. The unstructured objects may be designated for migration based on their creation date and/or other characteristics. Migration of an object may include conversion of the object to a serialized file in an object notation format. The database may maintain a header of the migrated object indicating the location to which the object was migrated.

18 Claims, 7 Drawing Sheets

EXTERNAL STORAGE OF UNSTRUCTURED DATABASE OBJECTS

CROSS-REFERENCE TO RELATED APPLICATIONS

This application claims priority to Indian Provisional Application No. 202011018394, filed Apr. 29, 2020, the contents of which are incorporated by reference herein for all purposes.

BACKGROUND

Modern database systems store vast amounts of data for their respective enterprises. The data may include transactional data, master data, unstructured data and other data. Some database systems are capable of storing data of an entire database in volatile memory, thereby facilitating fast read and write access to such "in-memory" data.

A significant portion of data stored in a database may include unstructured data. Unstructured data may comprise large attachments (images, scans, CAD drawings, movies, etc.) which cannot be queried at the attribute level and therefore do not benefit from in-memory storage. Unstructured data may also comprise change documents which record the changes made to object instances during create, modify, and delete operations. These change documents may be used to satisfy compliance requirements, and typically do not contribute to the primary functions for which the database system is employed.

Storage of unstructured data increases the Total Cost of Ownership (TCO) of a database system, particularly in the case of in-memory database systems which use expensive volatile memory, without providing commensurate benefits. Systems are needed to efficiently reduce the amount of operational memory used to store unstructured data, while still providing efficient access to the unstructured data.

DETAILED DESCRIPTION

The following description is provided to enable any person in the art to make and use the described embodiments and sets forth the best mode contemplated for carrying out some embodiments. Various modifications, however, will be readily-apparent to those in the art.

Some embodiments operate to migrate unstructured objects such as, but not limited to, attachments and platform change documents from a database to a cloud-provided external object storage. The unstructured objects may be designated for migration based on their creation date and/or other characteristics. Migration of an object may include conversion of the object to a serialized file in an object notation format. The database may maintain a header of the migrated object indicating the location to which the object was migrated.

Embodiments may therefore reduce a TCO of a database system by reducing an amount of memory required for data storage. Reducing the amount of occupied memory may in turn reduce downtime required for tenant lifecycle operations (e.g., move, copy, refresh, restore).

Figure 1:
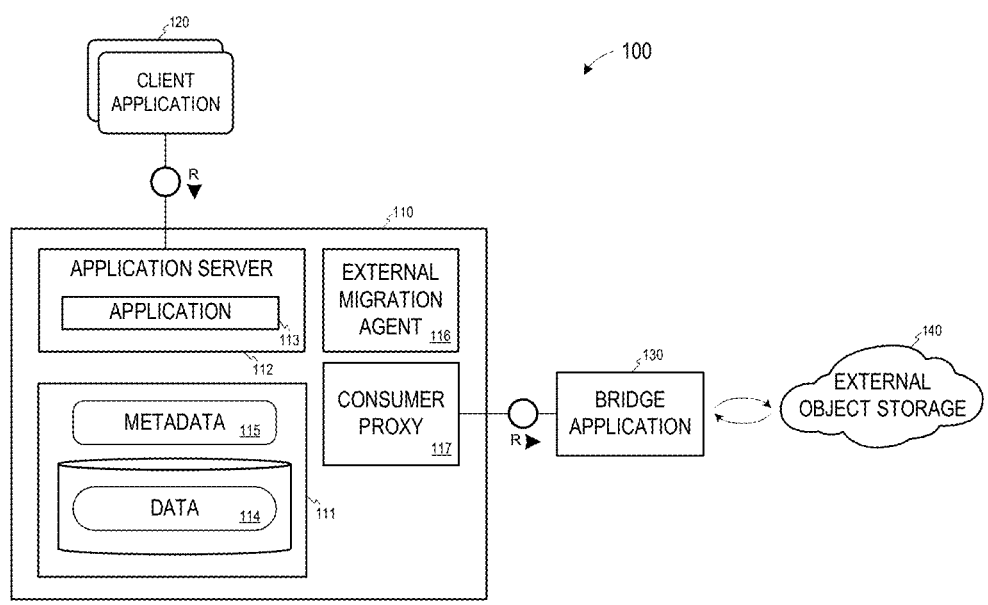
FIG. 1 is a block diagram of a system to migrate unstructured data objects to an external storage according to some embodiments.

FIG. 1 is a block diagram of system 100 according to some embodiments. The illustrated elements of system 100 may be implemented using any suitable combination of computing hardware and/or software that is or becomes known. In some embodiments, two or more elements of system 100 are implemented by a single computing device. One or more elements of system 100 may be implemented as a cloud service (e.g., Software-as-a-Service, Platform-as-a-Service).

Generally, platform 110 receives queries from client applications 120 and returns results thereto based on data stored within database server 111. Database server 111 may comprise any combination of volatile memory (e.g., Random Access Memory (RAM)) and non-volatile memory (e.g., fixed disk, Flash memory, non-volatile (RAM)).

Platform 110 executes program code to provide application server 112. Application server 112 provides services for executing server applications such as application 113. For example, a Web application executing on application server 112 may receive HyperText Transfer Protocol (HTTP) requests from client applications 120 and return data 114 from storage 111 in response thereto.

Data 114 of database server 111 may comprise one or more of conventional tabular data, row-based data, column-based data, and object-based data. Metadata 115 describes the structure and characteristics of data 114 as is known in the art. Moreover, data 114 may be indexed and/or selectively replicated in an index to allow fast searching and retrieval thereof. Database server 111 may support multi-tenancy to separately support multiple unrelated clients by providing multiple logical database systems which are programmatically isolated from one another.

As mentioned above, database server 111 may implement an "in-memory" database, in which a full database stored in volatile (e.g., non-disk-based) memory. The full database may be persisted in and/or backed up to fixed disks (not shown). Embodiments are not limited to an in-memory implementation. For example, data may be stored in RAM (e.g., cache memory for storing recently-used data) and one or more fixed disks (e.g., persistent memory for storing their respective portions of the full database).

According to some embodiments, external migration agent 116 may identify objects of data 114 to be migrated to an external storage (e.g., based on a predetermined retention period), retrieve and convert the item data of the identified objects into JSON (JavaScript Object Notation) format, and push the converted objects to consumer proxy 117. As will be described below, the header data of the identified objects may be maintained in data 114, and may be updated to indicate that the identified objects are stored in the external storage. External migration agent 116 may also be responsible for controlling the reading of externally-stored objects, and the movement, replication and deletion of externally-stored objects based on corresponding changes to the objects in database server 111.

Consumer proxy 117 may provide authentication and establish an HTTP connection with bridge application 130. The functionalities provided by consumer proxy 117 may be reused by other agents, services or applications executing within platform 110.

Bridge application 130 receives converted object data (e.g., JSON files) from platform 110 and pushes the data to external object storage 140. External object storage 140 may comprise a scalable, flexible, and cost-effective cloud storage solution that allows storage of large amounts of unstructured data as 'Objects'. Bridge application 130 may, based on information received from external migration agent 116 via consumer proxy 117, read externally-stored objects and move/replicate/delete externally-stored objects based on corresponding changes to the objects in database server 111.

Figure 2:
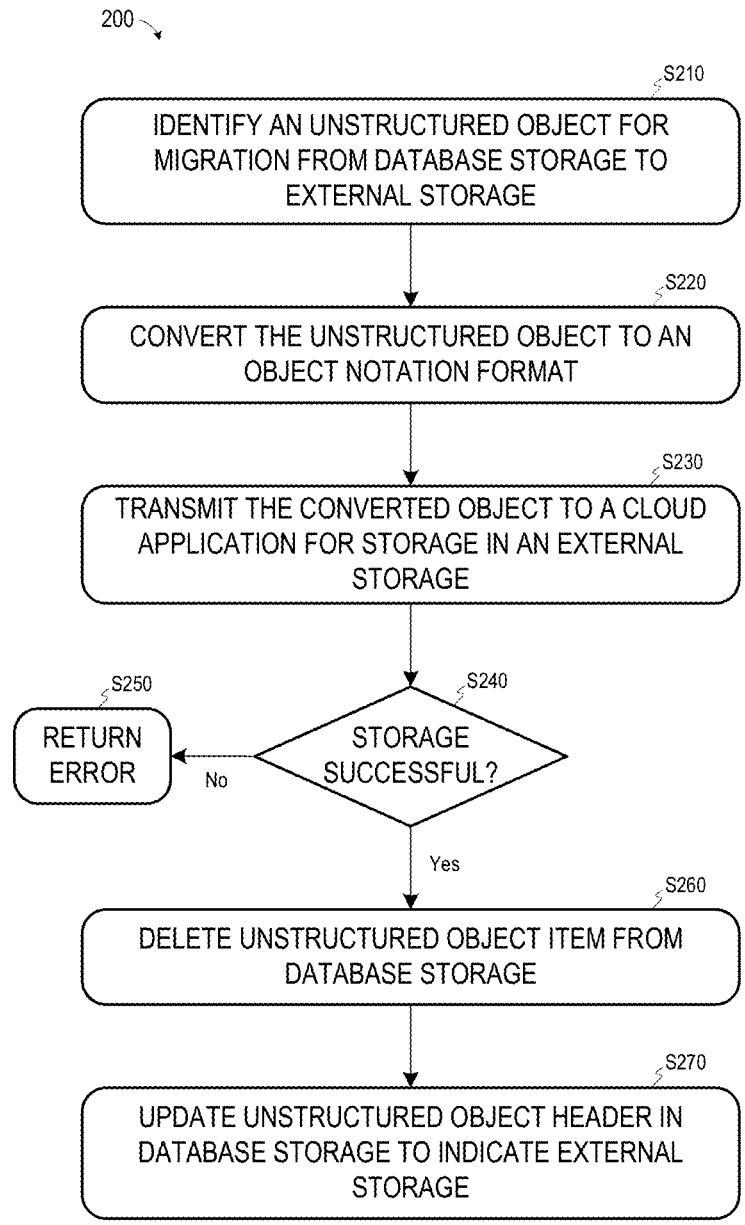
FIG. 2 is a flow diagram of a process to migrate unstructured data objects to an external storage according to some embodiments.

FIG. 2 comprises a flow diagram of process 200 according to some embodiments. Process 200 will be described with respect to the elements of system 100, but embodiments are not limited thereto.

Process 200 and all other processes mentioned herein may be embodied in computer-executable program code read from one or more of non-transitory computer-readable media, such as a hard disk drive, a volatile or non-volatile random access memory, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, at S210, an unstructured object is identified for migration from database storage to external storage. Such identification may be performed by agent 116, which runs as a background job to determine objects of one or more specified types (e.g., change documents, video attachments) having a creation date earlier than a threshold creation date. For example, S210 may comprise identifying any unstructured data objects stored in data 114 which were created over one month from the present time. S210 may therefore comprise identifying more than one unstructured object for migration.

Next, at S220, the unstructured object is converted to an object notation format. As mentioned above, external migration agent 116 may convert the item data of the identified object into JSON format at S220. The converted object is transmitted to a cloud application for storage in an external storage at S230.

According to some embodiments of S230, external migration agent 116 pushes the converted object to consumer proxy 117, which in turn authenticates with the cloud application (i.e., bridge application 130) and provides converted object to bridge application 130 via a multipart HTTP request. In response, bridge application 130 stores the converted object in external object storage 140.

At S240, it is determined whether the storage was successful. According to some embodiments, and prior to S230, consumer proxy 117 calculates a digest (e.g., crypto-code) based on the content of the converted object. The digest is provided along with the object content in the HTTP request at S230. Upon receipt, bridge application 130 calculates the digest based on the object content and compares the received digest to the calculated digest. If the digests match, the storage is considered successful.

If the storage is not successful, an error is returned at S250. If so, the item data of the object is deleted from data 114 at S260. Next, at S270, the header data of the unstructured object is updated in data 114 to indicate that the item data of the unstructured object is stored in external storage 140. Such an indication may be used as described below for reading the item data from external storage 140.

Figure 3:
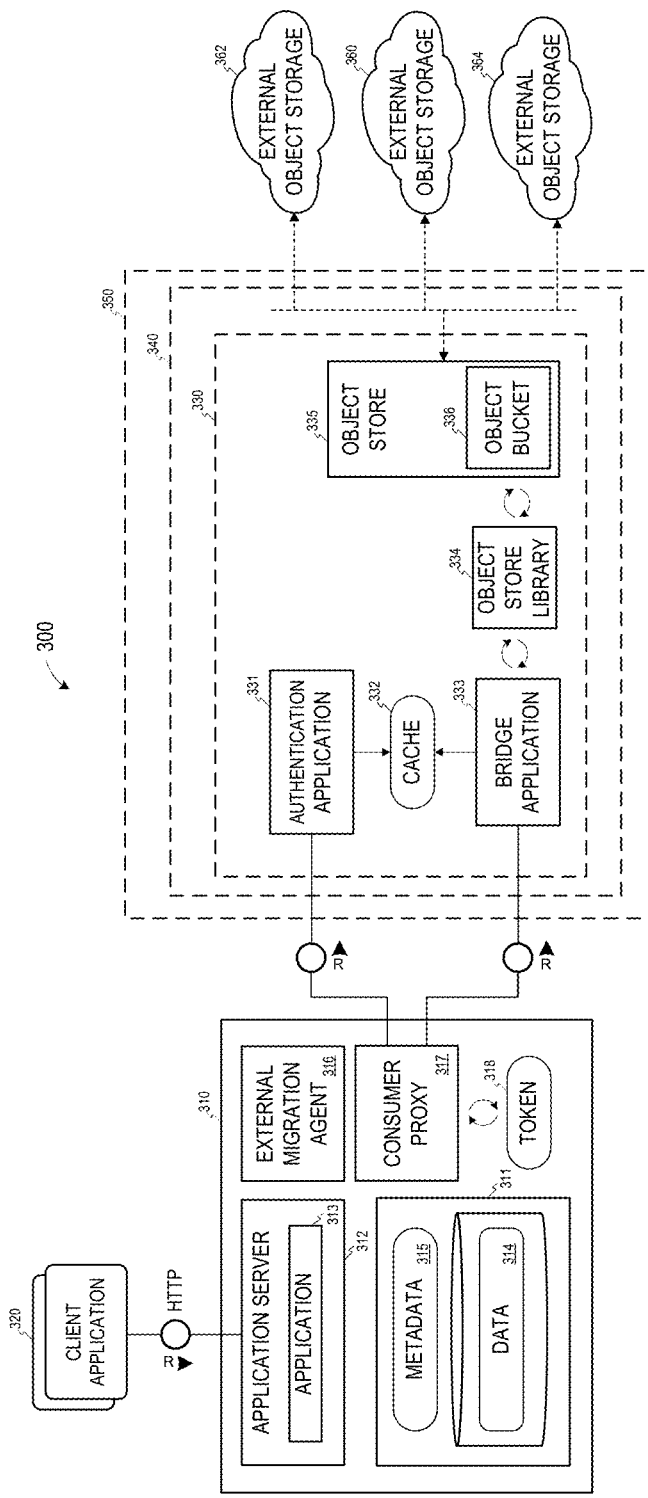
FIG. 3 is a block diagram of a system to migrate unstructured data objects to an external storage according to some embodiments.
Figure 4:
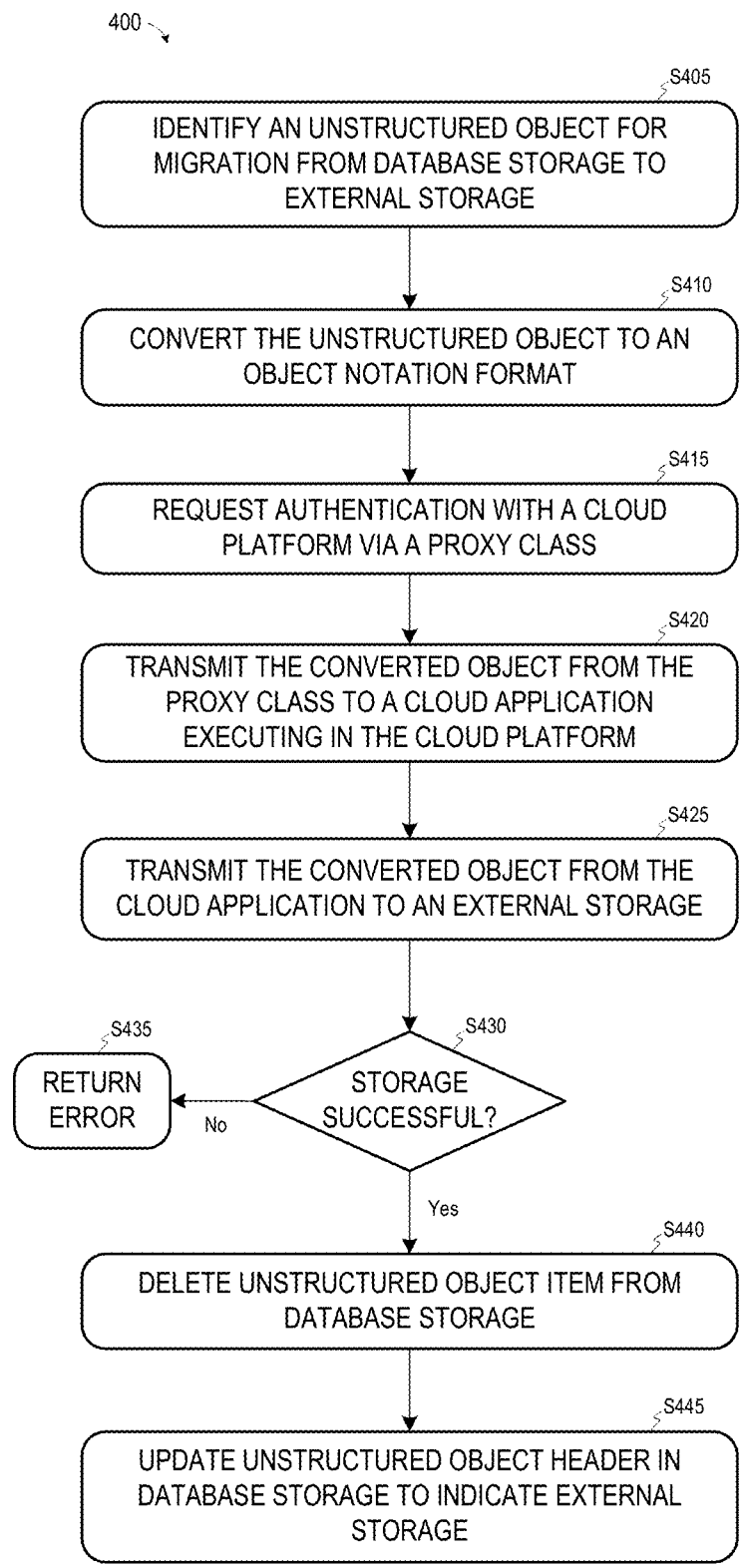
FIG. 4 is a flow diagram of a process to migrate unstructured data objects to an external storage according to some embodiments.

FIG. 3 is a block diagram of system 300 to provide migration of unstructured data objects according to some embodiments. System 300 may comprise a specific implementation of system 100 of FIG. 1, but embodiments are not limited thereto. The elements of system 300 may operate as described with respect to similarly-named elements of system 100, but with the additional or alternative features described below.

Database server 310 includes authentication token store 318 accessed by consumer proxy 317. During the authentication with bridge application 333 as described above, consumer proxy 317 requests an authentication token from authentication application 331 using corresponding client credentials. Authentication application 331 performs the authentication and returns a valid token back to consumer proxy 317. This authentication token is stored in token store 318 and may be used by consumer proxy 317 as a header parameter for authentication in subsequent requests to bridge application 333. Authentication application 331 also stores the token in cache 332, which may store the token for a fixed time before the token becomes invalid.

Authentication application 331 and bridge application 333 execute within sub-account 330 of cloud foundry 340 running on cloud platform 350. According to some embodiments, cloud foundry 340 is an open source software bundle for providing a polyglot Cloud Computing Platform as a Service (PaaS), which may run on different IaaS offerings (e.g., Openstack, Amazon Elastic Cloud 2 (EC2), SAP Monsoon), enable application development on different runtimes (e.g., Node.js, Java, Ruby, .NET), and allow integration of arbitrary platform services (e.g., mongoDB, RabbitMQ) and applications services (e.g., mail, document). According to some embodiments, authentication application 331 and bridge application 333 are Node JS applications.

Bridge application 333 receives a JSON file from consumer proxy 317 within a multipart HTTP request as described above. The multipart HTTP request includes the authentication token received from authentication application 331. Bridge application 333 compares this token with a token stored in cache 332 by authentication application 331. Upon successful verification, bridge application 333 sends the JSON file to object store 335 via the object store library 334, after which the JSON file is stored in a selected one of external object storages 360-364.

Process 400 may be executed to migrate an unstructured object to external storage. Initially, at S405, an unstructured object is identified for migration from database storage to external storage. Such identification may be performed by agent 316, and may be based on creation date as described above, on a blacklist of objects which are not to be stored externally, on data indicating historical object usage, and/or on any other suitable parameter(s).

Figure 5:
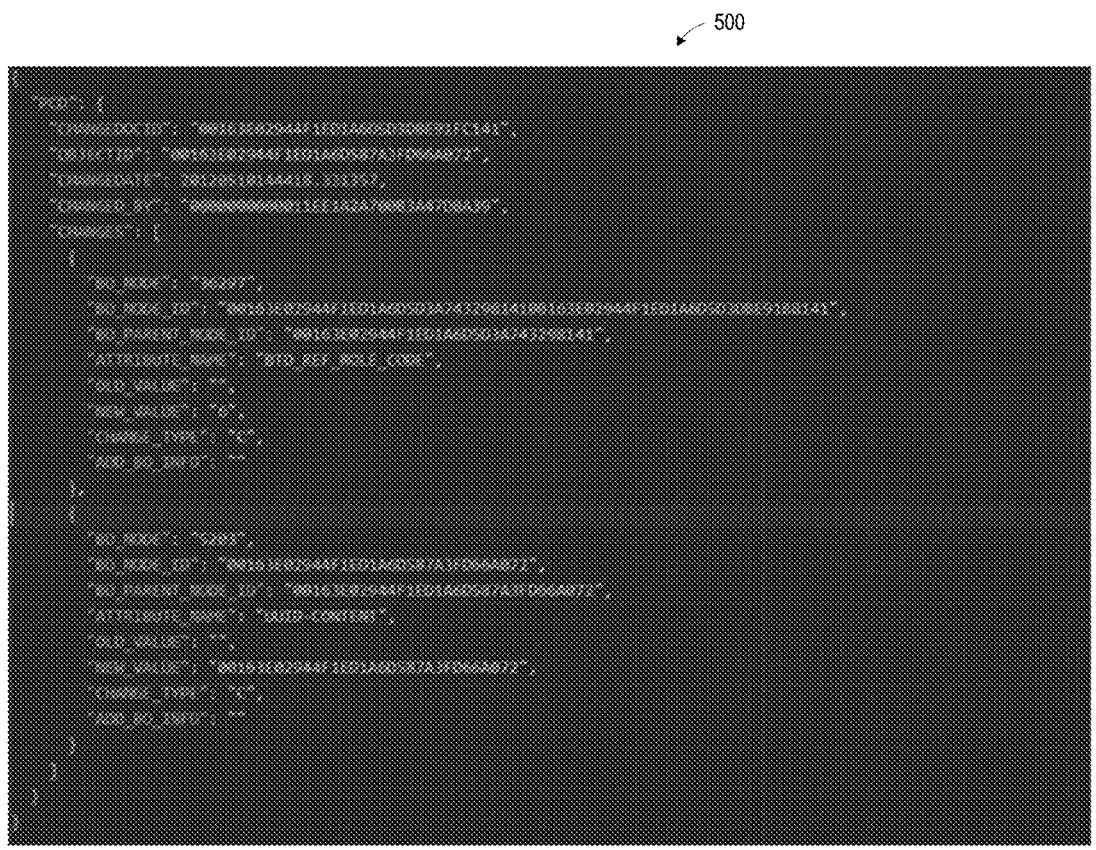
FIG. 5 illustrates an object serialization pattern according to some embodiments.

Next, at S410, external migration agent 316 may convert the item data of the identified object into JSON format. FIG. 5 illustrates serialization pattern 500 which may be used in some embodiments to perform the conversion at S410.

Consumer proxy 317 requests an authentication token at S415 from authentication application 331 executing on cloud platform 350 using corresponding client credentials. Authentication application 331 performs the authentication and returns a valid token back to consumer proxy 317. This authentication token is stored in token store 318 and is used within a multipart HTTP request to transmit the JSON file from consumer proxy 317 to bridge application 333 at S420.

Upon successful verification of the token against a token stored in cache 332, bridge application 333 sends the JSON file to object store 335 via the object store library 334, after which the JSON file is stored in a selected one of external object storages 360-364.

If it is determined at S430 that the storage was not successful, an error is returned at S435. If the storage was successful, the item data of the object is deleted from data 314 at S440. Next, at S445, the header data of the unstructured object is updated in data 314 to indicate that the item data of the unstructured object is stored in the corresponding one of external storages 360-364.

Figure 6:
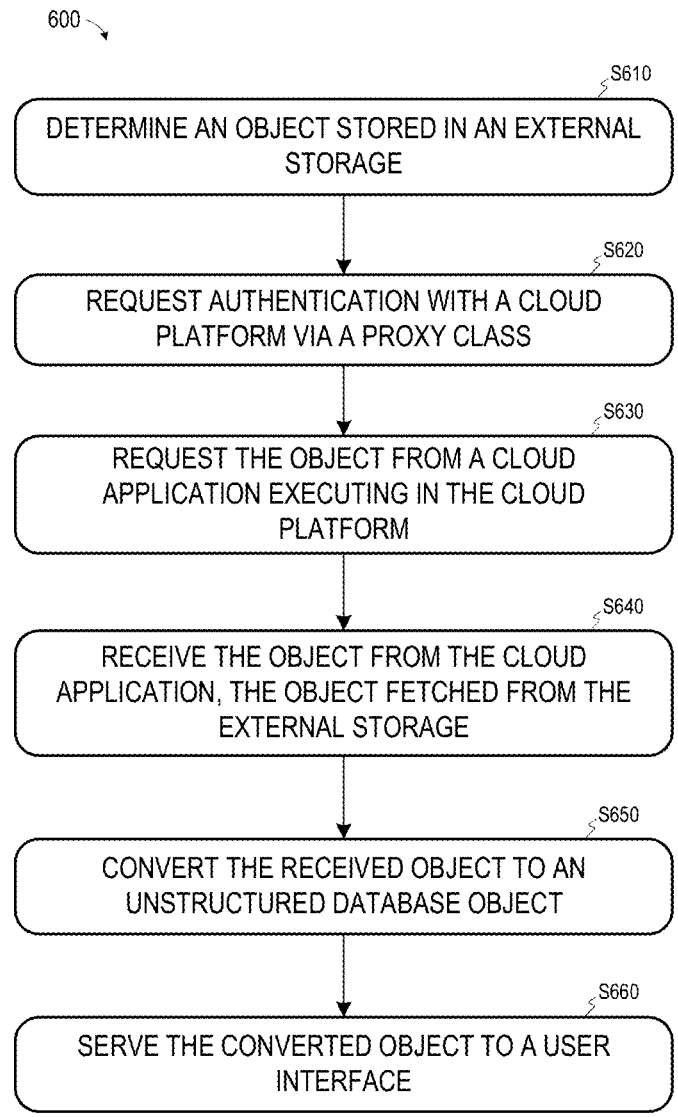
FIG. 6 is a flow diagram of a process to retrieve unstructured data objects from an external storage according to some embodiments.

FIG. 6 illustrates process 600 to read an object from external storage according to some embodiments. Flow begins at S610, at which an object stored in an external storage is determined. S610 may comprise reception of a command from application 313 to read an object, such as a change document or an unstructured attachment, and determination, based on a stored header of the object, that the item data of the object is stored in an external cloud storage.

Next, at S620, authentication with a cloud platform is requested via a proxy class. In some embodiments, consumer proxy 317 requests an authentication token at S620 from authentication application 331 executing on cloud platform 350 using corresponding client credentials. Authentication application 331 performs the authentication and returns a valid token back to consumer proxy 317.

The object is requested from a cloud application executing on the cloud platform at S630. The request may comprise a multipart HTTP GET request from consumer proxy 317 to bridge application 333 which includes the token received from authentication application 331. In response to the request, bridge application 333 fetches the corresponding JSON object from the external storage 360-364 in which it is stored. Bridge application 333 then returns the JSON object to consumer proxy 317 at S640.

Agent 316 receives the JSON object from consumer proxy 317 and converts (i.e., de-serializes) the object into its original unstructured database object at S650. The unstructured database object is then served to application 313 at S660, where it can be used in display screens, APIs or in any other suitable manner.

Figure 7:
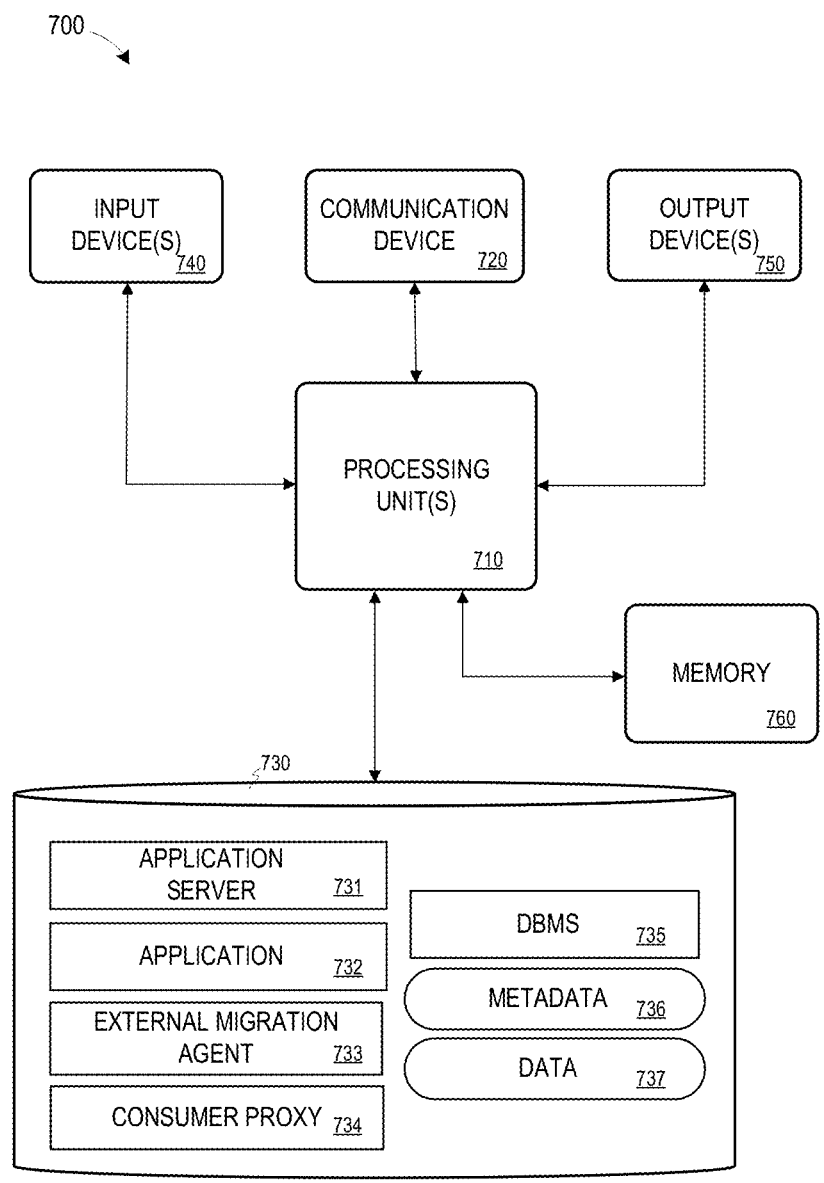
FIG. 7 is a block diagram of a database server according to some embodiments.

FIG. 7 is a block diagram of database server 700 according to some embodiments. Database server 700 may comprise a general-purpose computing apparatus and may execute program code to perform any of the functions described herein. Database server 700 may comprise an implementation of database server 100 or 300 in some embodiments. Database server 700 may include other unshown elements according to some embodiments.

Database server 700 includes processing unit(s) 710 operatively coupled to communication device 720, data storage device 730, one or more input devices 740, one or more output devices 750 and memory 760. Communication device 720 may facilitate communication with external devices, such as an external network, the cloud, or a data storage device. Input device(s) 740 may comprise, for example, a keyboard, a keypad, a mouse or other pointing device, a microphone, knob or a switch, an infra-red (IR) port, a docking station, and/or a touch screen. Input device(s) 740 may be used, for example, to enter information into apparatus 700. Output device(s) 750 may comprise, for example, a display (e.g., a display screen) a speaker, and/or a printer.

Data storage device 730 may comprise any appropriate persistent storage device, including combinations of magnetic storage devices (e.g., magnetic tape, hard disk drives and flash memory), optical storage devices, Read Only Memory (ROM) devices, and RAM devices, while memory 760 may comprise a RAM device.

Application server 731, application 732, agent 733 and consumer proxy 734 may each comprise program code executed by processing unit(s) 710 to cause server 700 to perform any one or more of the processes described herein. Embodiments are not limited to execution of these processes by a single computing device.

Database Management System (DBMS) 735 may comprise a DBMS as is known in the art, and metadata 736 and data 737 may comprise any suitable metadata and data as described herein. Data storage device 730 may also store data and other program code for providing additional functionality and/or which are necessary for operation of database server 700, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation some embodiments may include a processor to execute program code such that the computing device operates as described herein.

Embodiments described herein are solely for the purpose of illustration. Those in the art will recognize other embodiments may be practiced with modifications and alterations to that described above.

What is claimed is:

1. A system comprising:
   a memory storing processor-executable process steps;
   a processing unit to execute the processor-executable process steps to cause the system to:
   identify an unstructured object for migration from a database storage to an external storage, the unstructured object comprising an unstructured object item and an unstructured object header;
   convert the unstructured object item to an object notation format;
   transmit the converted unstructured object item to a cloud application for storage in an external storage; and
   in response to a determination that the storage in the external storage is successful:
   delete the unstructured object item from the database storage; and
   update the unstructured object header in the database storage to indicate the converted unstructured object item is stored in the external storage.

2. The system according to claim 1, wherein identification of the unstructured object for migration from the database storage to the external storage comprises determining a creation date of the unstructured object is greater than a threshold time prior to a current date.

3. The system according to claim 1, wherein transmission of the converted unstructured object to the cloud application for storage in the external storage comprises:
- execution of a proxy class to request authentication with a cloud platform executing the cloud application; and
- transmission of the converted unstructured object item from the proxy class to the cloud application.

4. The system according to claim 1, the processing unit to execute the processor-executable process steps to cause the system to:
- receive a request for the unstructured object;
- determine, based on the unstructured object header in the database storage, that the unstructured object item is stored in the external storage;
- request the unstructured object item from the cloud application;
- receive the converted unstructured object;
- convert the received converted unstructured object to the unstructured object; and
- store the unstructured object in the database storage.

5. The system according to claim 4, wherein transmission of the converted unstructured object to the cloud application for storage in the external storage comprises:
- execution of a proxy class to request authentication with a cloud platform executing the cloud application; and
- transmission of the converted unstructured object from the proxy class to the cloud application.

6. The system according to claim 1, the processing unit to execute the processor-executable process steps to cause the system to:
- determine that the unstructured object has been deleted from the external storage; and
- in response to the determination that the unstructured object has been deleted from the external storage, transmit an instruction to the cloud application to delete the converted object from the external storage.

7. A computer-implemented method comprising:
- identifying an unstructured object for migration from a database storage to an external storage, the unstructured object comprising an unstructured object item and an unstructured object header;
- converting the unstructured object item to an object notation format;
- transmitting the converted unstructured object item to a cloud application for storage in an external storage; and
- in response to determining that the storage in the external storage is successful:
- deleting the unstructured object item from the database storage; and
- updating the unstructured object header in the database storage to indicate the converted unstructured object item is stored in the external storage.

8. The method according to claim 7, wherein identifying the unstructured object for migration from the database storage to the external storage comprises determining a creation date of the unstructured object is greater than a threshold time prior to a current date.

9. The method according to claim 7, wherein transmitting the converted unstructured object item to the cloud application for storage in the external storage comprises:
- executing a proxy class to request authentication with a cloud platform executing the cloud application; and
- transmitting the converted unstructured object from the proxy class to the cloud application.

10. The method according to claim 7, further comprising:
- receiving a request for the unstructured object;
- determining, based on the unstructured object header in the database storage, that the unstructured object item is stored in the external storage;
- requesting the unstructured object item from the cloud application;
- receiving the converted unstructured object;
- converting the received converted unstructured object to the unstructured object; and
- storing the unstructured object in the database storage.

11. The method according to claim 10, wherein transmitting the converted unstructured object item to the cloud application for storage in the external storage comprises:
- executing a proxy class to request authentication with a cloud platform executing the cloud application; and
- transmitting the converted unstructured object from the proxy class to the cloud application.

12. The method according to claim 7, further comprising:
- determining that the unstructured object has been deleted from the external storage; and
- in response to the determination that the unstructured object has been deleted from the external storage, transmitting an instruction to the cloud application to delete the converted object from the external storage.

13. A system comprising:
- a database system comprising a database storage storing database tables and unstructured objects, the database system to:
- identify an unstructured object for migration from the database storage to a cloud-based object store, the unstructured object comprising an unstructured object item and an unstructured object header;
- convert the unstructured object item to an object notation format;
- transmit the converted unstructured object item to a cloud application for storage in the cloud-based object store; and
- in response to a determination that the storage in the cloud-based object store is successful:
- delete the unstructured object item from the database storage; and
- update the unstructured object header in the database storage to indicate the converted unstructured object item is stored in the cloud-based object store.

14. The system according to claim 13, wherein identification of the unstructured object for migration from the database storage to the cloud-based object store comprises determining a creation date of the unstructured object is greater than a threshold time prior to a current date.

15. The system according to claim 13, wherein transmission of the converted unstructured object item to the cloud application for storage in the cloud-based object store comprises:
- execution of a proxy class to request authentication with a cloud platform executing the cloud application; and
- transmission of the converted unstructured object item from the proxy class to the cloud application.

16. The system according to claim 13, the database system to:
- receive a request for the unstructured object;
- determine, based on the unstructured object header in the database storage, that the unstructured object item is stored in the cloud-based object store;

request the unstructured object item from the cloud application;
receive the converted unstructured object;
convert the received converted unstructured object to the unstructured object; and
store the unstructured object in the database storage.

17. The system according to claim 16, wherein transmission of the converted unstructured object item to the cloud application for storage in the cloud-based object store comprises:
execution of a proxy class to request authentication with a cloud platform executing the cloud application; and
transmission of the converted unstructured object item from the proxy class to the cloud application.

18. The system according to claim 13, the database system to:
determine that the unstructured object has been deleted from the external storage; and
in response to the determination that the unstructured object has been deleted from the external storage, transmit an instruction to the cloud application to delete the converted object from the external storage.

\* \* \* \* \*

UNITED STATES PATENT AND TRADEMARK OFFICE
CERTIFICATE OF CORRECTION

| | |
|---|---|
| PATENT NO. | : 11,321,374 B2 |
| APPLICATION NO. | : 16/898899 |
| DATED | : May 3, 2022 |
| INVENTOR(S) | : Martin Steiert et al. |

It is certified that error appears in the above-identified patent and that said Letters Patent is hereby corrected as shown below:

In the Drawings

Please replace FIG 5. with Fig 5. as shown on the attached page.

Signed and Sealed this
Eighteenth Day of October, 2022

Katherine Kelly Vidal
*Director of the United States Patent and Trademark Office*

```
{
  "PCD": {
    "CHANGEDOCID": "00163E02944F1ED1A6D5D3DBE91FC141",
    "OBJECTID": "00163E02944F1ED1A6D587A3FD66A072",
    "CHANGEDATE": 20120510144418.331357,
    "CHANGED_BY": "0000000000011EE1A2A700B3A47D8A39",
    "CHANGES": [
      {
        "BO_NODE": "36297",
        "BO_NODE_ID": "00163E02944F1ED1A6D5D3A74329814100163E02944F1ED1A6D5D3DBE91B8141",
        "BO_PARENT_NODE_ID": "00163E02944F1ED1A6D5D3A743298141",
        "ATTRIBUTE_NAME": "BTD_REF_ROLE_CODE",
        "OLD_VALUE": " ",
        "NEW_VALUE": "6",
        "CHANGE_TYPE": "C",
        "ADD_BO_INFO": " "
      },
      {
        "BO_NODE": "5203",
        "BO_NODE_ID": "00163E02944F1ED1A6D587A3FD66A072",
        "BO_PARENT_NODE_ID": "00163E02944F1ED1A6D587A3FD66A072",
        "ATTRIBUTE_NAME": "UUID-CONTENT",
        "OLD_VALUE": " ",
        "NEW_VALUE": "00163E02944F1ED1A6D587A3FD66A072",
        "CHANGE_TYPE": "C",
        "ADD_BO_INFO": " "
      }
    ]
  }
}
```

FIG. 5